Aug. 28, 1956 J. FRASER 2,760,680
LIQUID-METER OPERATED MEANS FOR CONTROLLING VALVES
Filed Feb. 16, 1954 2 Sheets-Sheet 1

INVENTOR
John Fraser
BY

Aug. 28, 1956     J. FRASER     2,760,680
LIQUID-METER OPERATED MEANS FOR CONTROLLING VALVES
Filed Feb. 16, 1954     2 Sheets-Sheet 2
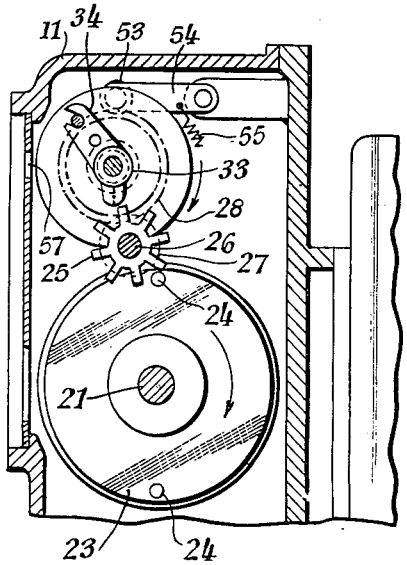
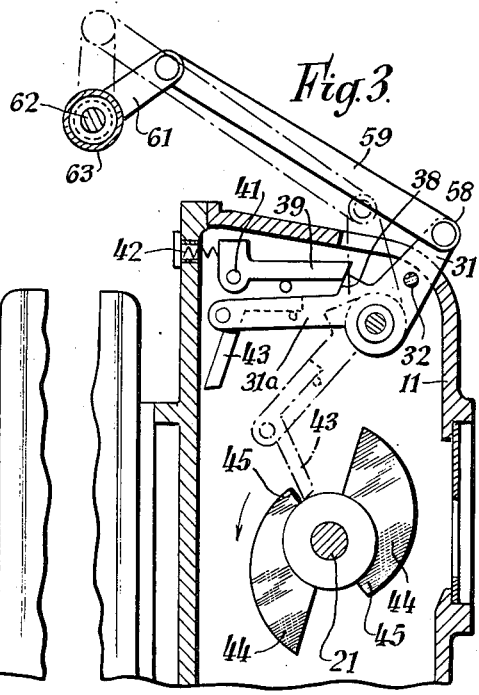
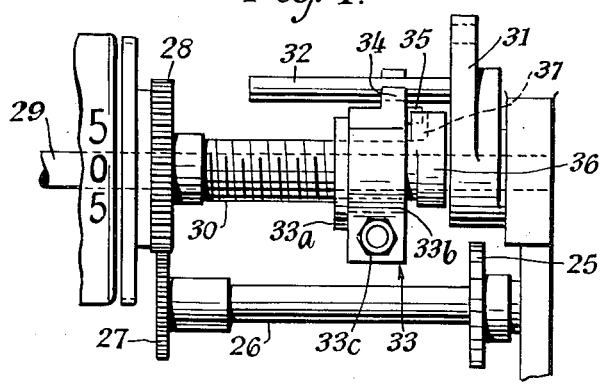
INVENTOR
John Fraser
BY

United States Patent Office 2,760,680
Patented Aug. 28, 1956

2,760,680

LIQUID-METER OPERATED MEANS FOR CONTROLLING VALVES

John Fraser, Tolworth, Surbiton, England, assignor to Avery-Hardoll Limited, Tolworth, Surbiton, England Application February 16, 1954, Serial No. 410,679

Claims priority, application Great Britain February 19, 1953

7 Claims. (Cl. 222—20)

This invention relates to liquid-meter operated means for controlling valves, and particularly to means operated by a liquid meter for closing a valve, through which the metered liquid passes, when a predetermined quantity of liquid has passed through the meter.

The object of the invention is to provide a valve controlling means suitable for controlling the delivery of liquid in large quantities, from a bulk storage or transport container, which means, although of simple construction, will terminate accurately a delivery of either a small quantity or a large quantity exceeding one thousand gallons.

According to the present invention, in liquid-meter operated valve controlling means a valve held open by resiliently loaded retaining means is released for closing by rotary movement of one element of a screw-and-nut mechanism, which element is restrained against rotation by the retaining means, the other element of the screw-and-nut mechanism being driven by the meter to effect relative rotation of the screw and nut until the engagement of co-operating abutments on said elements takes place and the element of said mechanism which is restrained against rotation by the retaining means is turned with the meter driven element to disengage said retaining means.

Further, according to the invention, in liquid meter operated valve controlling means rotation is imparted during operation of the meter to a screw-threaded spindle on which is mounted a nut restrained against rotation by a projection thereon having sliding engagement with a guide surface extending parallel to the spindle and carried by a valve-closing lever held in the valve-open position by resiliently loaded retaining means, the spindle also carrying an abutment which is engaged by the nut when the latter reaches a predetermined point on the spindle, thereby rotating the nut to displace the lever from the valve-open position.

The invention is hereinafter described with reference to the accompanying drawings, in which:

Figure 2 is a section on the line 2—2 of Figure 1;

Figure 3 is a section on the line 3—3 of Figure 1; and

Figure 4 is a scrap view of part of Figure 1, to a larger scale, showing the parts in another position.

Figure 1:
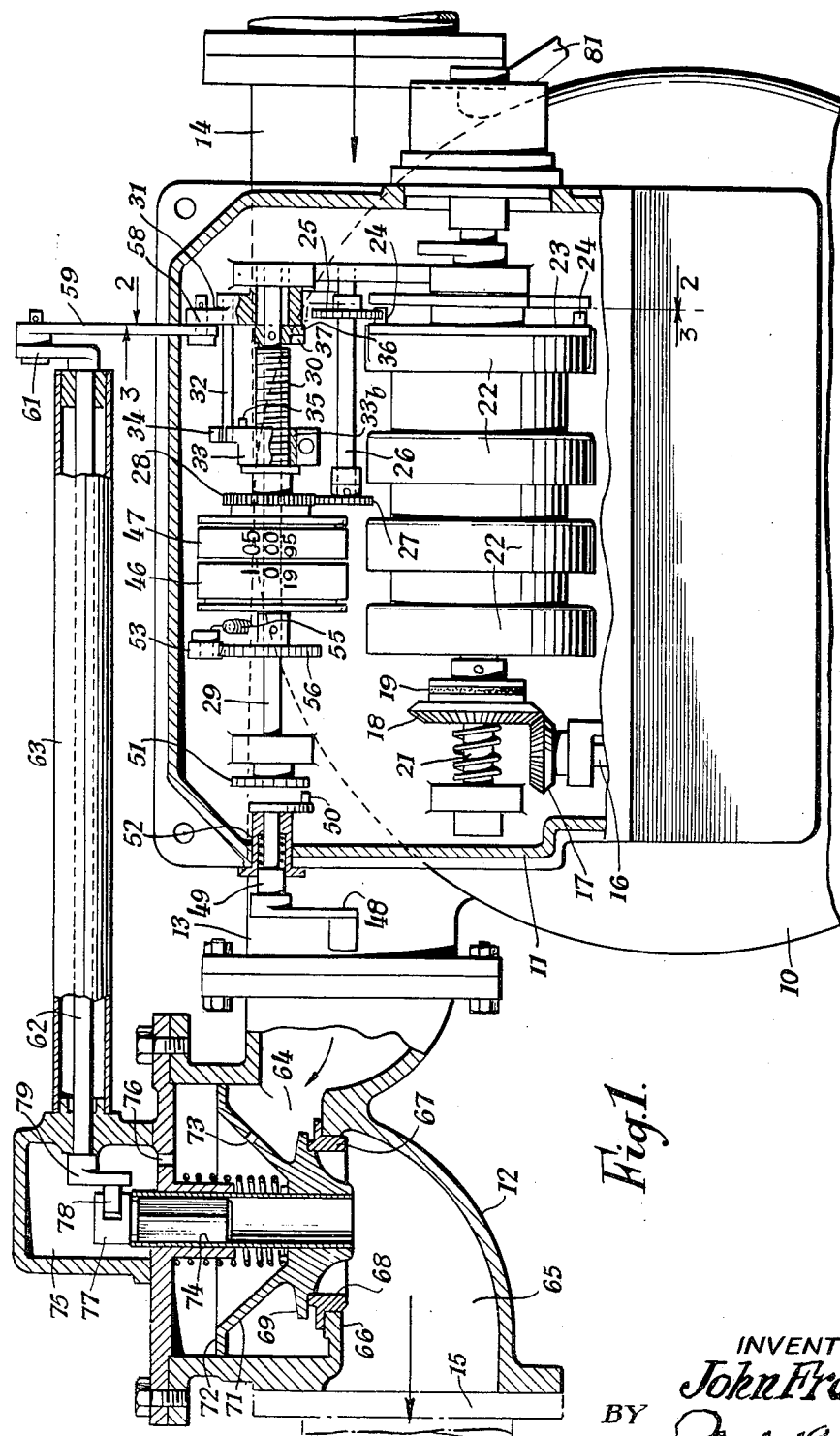
Figure 1 is a view in elevation, with parts in section, showing a preferred arrangement of controlling means according to the invention associated with a liquid meter and a valve.

Referring to the drawings, the housing of a liquid meter of the rotary displacement type is shown at 10, and has mounted on it a casing 11 containing the valve controlling means according to the invention. The said means act to control a valve 12 through which passes liquid flowing from the outlet 13 of the meter. Liquid enters the meter through an inlet 14, and leaves the valve through an outlet 15. The meter includes a rotor driven by the liquid and mounted on a shaft connected by gearing (not shown) to a shaft 16 which drives, through bevel gears 17 and 18 and a friction clutch 19, a spindle 21 on which is mounted a cyclometer-type counter 22, the gearing being so arranged that the spindle 21 rotates through one half revolution during the delivery of a predetermined unit quantity of liquid.

The spindle 21 has fixedly mounted on it a disc 23 carrying two longitudinally projecting pins 24 spaced 180° apart and co-operating with a star wheel 25 mounted on another spindle 26 lying parallel to the spindle 21, thus providing an intermittent drive to the spindle 26, the star wheel being rotated one tooth for each half-revolution of the spindle 21. It will be understood that only one pin 24, or more than two pins 24, may be provided, depending on the rate at which the spindle 26 is desired to turn, and that other forms of intermittent gearing may be used in place of that described. The spindle 26 also carries a gear wheel 27 meshing with a gear wheel 28 fixed to a valve controlling spindle 29 formed with a screw thread 30 forming the screw element of a screw-and-nut mechanism. A displaceable member hereinafter called the valve controlling lever 31 is mounted to turn on the spindle 29, and carries a pin 32 extending parallel to, and alongside the screw thread 30 on the spindle 29. The nut element 33 of the screw-and-nut mechanism is mounted on the screw-threaded part of the spindle 29 and is formed with a radially projecting lug 34 engaging the pin 32, which thus forms a guide member resisting rotation of the nut 33 and carries a longitudinally projecting pin 35. An abutment member 36 fixed to the spindle 29 has an abutment face 37 lying in a place radial to said spindle, the pin 35 being adapted to engage the face 37 when the nut, moving towards the right in Figure 1, reaches a predetermined position on the spindle 29, thus providing a positive drive to the nut 33 from the spindle 29. The nut 33 includes an inner sleeve 33a screw-threaded internally to engage the screw thread 30 and externally to engage the screw-threaded bore of a split outer portion 33b clamped on to the inner portion 33a by a bolt 33c. The outer portion 33b can thus be angularly adjusted relative to the inner portion 33a to adjust the point at which the pin 35 strikes the face 37.

The valve controlling lever 31, which is connected to the valve 12 in a manner hereinafter described, has a surface 38 which is engaged, when the valve is open, by a spring-loaded detent 39, as shown in Figure 3, the detent 39 being pivotally mounted at 41 in the casing 11, and being urged to its operative position by the spring 42. The detent 39 is so arranged that the application to the lever 31 of a torque exceeding a predetermined limit will force it out of engagement with the surface 38, thus allowing the lever 31 to turn in the valve closing direction, and the spring 42 is so calibrated that the detent will resist turning of the lever by the nut due to friction between the nut and the screw-thread, but will be released when the nut is driven positively by the spindle 29. An arm 31a integral with the lever 31 carries a cam follower 43 co-operating with a two-lobed edge cam 44 fixed in the spindle 21, the lobes of the cam 44 being so formed that each of them is of decreasing height in the direction of rotation of the spindle 21, and terminates in an abrupt cut-off 45, the two cut-offs being spaced 180° apart and being so positioned that the follower, if it is engaging the cam, always reaches a cut-off when the counter 22 shows a whole number of unit quantities of liquid.

A pair of setting drums 46 and 47 are mounted on the valve-controlling spindle 29, the drum 47 rotating with that spindle and the drum 46 being rotated one step for each revolution of the drum 47. The drum 47 is, for example, marked to indicate quantities of liquid from 0 unit quantities to 95 unit quantities in steps of 5, so that one revolution represents 100 unit quantities, and the drum 46 is marked in 20 steps from 0 to 19. A handle 48 is mounted on a spindle 49 co-axial with the spindle 29, the spindle 49 carrying, on a disc fixed thereto, an eccentric pin 50 adapted to engage with a notched disc 51 on the spindle 29 to rotate the said spindle and set the drums 46 and 47 to show any desired quantity from 5 unit quantities to 1,995 unit quantities, the pin 50 being normally urged out of engagement with the disc 51 by a spring 52. A roller 53 mounted on a pivoted arm 54 is urged by a spring 55 into engagement with another notched disc 56 fixed to the spindle 29, the notches in the disc 56 being so located with relation to the figures on the drum 47 that the roller tends to locate the spindle with any one of the said figures accurately in register with a window 57 in the casing 11.

The valve-controlling lever 31 is pivotally connected at 58 to one end of a rigid link 59, the other end of which is pivotally connected to an arm 61 fixed to a spindle 62 rotatably mounted in bearings in a sleeve 63 fixed to the casing of the valve 12. The valve 12 comprises inlet and outlet chambers 64 and 65 separated by a diaphragm 66 in which is mounted a seat ring 67 defining a through passage 68. The valve closure member comprises a disc 69 adapted to engage the seat ring 67, and a flared skirt 71 terminating in a flange 72 the edge of which engages the wall of the inlet chamber 64, the effective area of the skirt being greater than that of the disc 69. The meter outlet 13 opens into the inlet chamber 64 between the diaphragm 66 and the skirt 71, and a small port 73 in the skirt admits liquid to the back of the skirt. The valve closure member includes a tube 74 passing through the wall of the inlet chamber 64 opposite to the diaphragm 66 into another chamber 75 connected by a port 76 to the part of the inlet chamber behind the skirt 71, and a pilot valve 77 controls the flow of liquid through this tube. The pilot valve is movable in the tube by a crank-pin 78 mounted on a crank 79 fixed to the spindle 62.

To set the controlling means for the delivery of a selected quantity of liquid the handle 48 is pressed inwardly to engage the pin 50 with a notch on the disc 51, and the spindle 29 is rotated by means of the handle until the drums 46, 47 indicate the selected quantity, the nut 33 being moved to the left along the screw-thread 30 by a distance proportional to the reading shown on the drums 46, 47. A pump (not shown) supplying liquid to the meter inlet 14 is started, and the arm 31 is moved manually to open the pilot valve 77, thus enabling the liquid, acting in the inlet chamber 64 of the valve 12 to move the valve closure member off its seat, since pressure built up in the chamber 74 above the skirt 71, and in the chamber 75 is relieved through the tube 74. The detent 39 comes into engagement with the surface 38 when the arm 31 is moved manually, to hold the pilot valve open, the parts being then in the position shown in full lines in Figure 3. As the liquid flows through the meter and valve, the meter drives the spindle 21 which in turn drives, through the pins 24, star wheel 25, and gearing 27, 28, the spindle 29. The movement of the spindle 29 is intermittent, the star wheel being moved one tooth for each unit quantity of liquid passing through the meter. The rotation of the spindle 29 causes the drums 46 and 47 to move back towards the zero position, and causes the nut 33 to move to the right along the screw thread 30, rotation of the nut being prevented by the pin 32.

During delivery of the last unit quantity of liquid, the pin 35 on the nut 33 comes into engagement with the surface 37 as shown in Figure 4, and the nut is forced to turn with the spindle 29, thus turning the lever 31 to force the detent 39 out of engagement and allowing the cam follower 43 to drop on to one lobe of the cam 44, which stops its further movement, and move the pilot valve 77 towards its closed position to cause partial closure of the valve 12. The cam lobes are so positioned in relation to the pins 24 that one of the cam lobes is in the path of the follower 43 when the step of movement of the spindle 29 which releases the detent 39 takes place. When delivery of the last unit quantity of liquid has been completed, the cam follower 43 reaches the cutoff 45 of the cam lobe, and moves to the position shown in chain-dotted lines in Figure 3, thus completing the closing of the valve 12. During the period for which the follower 43 is in engagement with the cam 44, the valve controlling spindle 29 remains stationary, since neither of the pins 24 engages the star wheel 25 during that period.

Zeroising of the counter 22 is effected in the known manner by the turning of a handle 81 (Figure 1), the spindle being turned in the opposite direction to that in which it is turned by the meter. The follower 43 is pivotally mounted on the lever 31 so as to be free to ride over the lobes of the cam 44 during the zeroising operation.

I claim:

1. Means for delivering liquid in predetermined quantities comprising a meter, a self-closing valve controlling the flow of liquid through the meter, retaining means to hold said valve open, resilient means acting on said retaining means to oppose release of the valve, screw-and-nut mechanism comprising a screw element and a nut element, rotary drive means actuated by said meter to rotate one of said elements, said other element being restrained against rotation by said retaining means, co-operating abutments on said screw and nut elements adapted to engage one another when one of the said elements is in a predetermined position relative to the other to rotate the other of said elements and release the retaining means so as to permit closing of the valve, and means for manually rotating said meter-rotated element.

2. Means for delivering liquid in predetermined quantities comprising a meter, a self-closing valve controlling the flow of liquid through the meter, screw and nut mechanism comprising a screw element and a nut element, rotary drive means actuated by said meter to rotate one of said elements, a displaceable member, means connecting said displaceable member to the valve so that opening and closing of the said valve is accompanied by displacement of said displaceable member, retaining means to hold said displaceable member in a position such that the valve is open and adapted to be released by a load on said displaceable member exceeding a predetermined value, means carried by said displaceable member to oppose rotation of the other element of said screw-and-nut mechanism, co-operating abutments on said screw and nut elements adapted to engage one another when one of said elements is in a predetermined position relative to the other and exert a torque on said other element sufficient to release said retaining means and thereby permit closing of the valve, and means for manually rotating said meter-rotated element.

3. Means for delivering liquid in predetermined quantities comprising a meter, a self-closing valve controlling the flow of liquid through the meter, screw-and-nut mechanism comprising a screw element and a nut element, rotary drive means actuated by said meter to rotate said screw element, a displaceable member, means connecting said displaceable member to the valve so that opening and closing of said valve is accompanied by displacement of said displaceable member, retaining means to hold said displaceable member in a position such that the valve is open and adapted to be released by a load on said displaceable member exceeding a predetermined value, a guide member fixed to said displaceable member and extending parallel to said screw element, a radial projection on said nut element engaging said guide member to oppose rotation of said nut element, co-operating abutments on said screw and nut elements adapted to engage one another when the nut element is in a predetermined position relative to the screw element and exert a torque on the nut element sufficient to release the retaining means and thereby permit closing of the valve, means for manually rotating said screw element to move the nut element away from the said predetermined position, and indicating means coupled to said screw element.

4. Means for delivering liquid in predetermined quantities comprising a meter, a self-closing valve controlling the flow of liquid through the meter, screw-and-nut mechanism comprising a screw element and a nut element, rotary drive means actuated by said meter to rotate one of said elements, a displaceable member, means connecting said displaceable member to the valve so that opening and closing of the said valve is accompanied by displacement of said displaceable member, retaining means to hold said displaceable member in a position such that the valve is open and adapted to be released by a load on said displaceable member exceeding a predetermined value, means carried by said displaceable member to oppose rotation of the other element of said screw-and-nut mechanism, co-operating abutments on said screw and nut elements adapted to engage one another when one of the said elements is in a predetermined position relative to the other and exert a torque on said other element sufficient to release said retaining means, stepped cam means rotated by said meter, a cam follower on said displaceable member adapted to engage said cam means when the displaceable member is released by said retaining means and limit the closing of the valve until the said follower reaches a step on the cam, and means for manually rotating said meter rotated element.

5. Means for delivering liquid in predetermined quantities comprising a meter, a self-closing valve controlling the flow of liquid through the meter, screw-and-nut mechanism comprising a screw element and a nut element, a spindle driven continuously by the meter, intermittent gearing between said spindle and said screw element to rotate said screw element, a displaceable member, means connecting said displaceable member to the valve so that opening and closing of said valve is accompanied by displacement of said displaceable member, retaining means to hold said displaceable member in a position such that the valve is open and adapted to be released by a load on said displaceable member exceeding a predetermined value, a guide member fixed to said displaceable member and extending parallel to said screw element, a radial projection on said nut element engaging said guide member to oppose rotation of said nut element, co-operating abutments on said screw and nut elements adapted to engage one another when the nut element is in a predetermined position relative to the screw element and exert a torque on the nut element sufficient to release the retaining means, cam means mounted on said spindle, and a cam follower on said displaceable member adapted to engage said cam means when the displaceable member is released by said retaining means to limit the closing of the valve, said cam being formed with a cut-off step to allow further movement of the displaceable member at a predetermined position of the cam and thereby permit final closure of the valve.

6. Means for delivering liquid in predetermined quantities according to claim 5, wherein the intermittent gearing comprises a disc mounted on the spindle, at least one pin projecting from a face of the disc, a star wheel the teeth of which are engaged by the said pins, a first gear wheel mounted to rotate with the star wheel, and a second gear wheel on said screw meshing with said first gear wheel.

7. Means for delivering liquid in predetermined quantities comprising a meter, a self-closing valve controlling the flow of liquid through the meter, a displaceable member, means connecting said displaceable member to the valve so that opening and closing of the valve is accompanied by displacement of said displaceable member, retaining means to hold said displaceable member in a position such that the valve is open, a spindle driven continuously by said meter, a screw, intermittent gearing interposed between said spindle and said screw to drive said screw, a nut on said screw, means to release said retaining means when the nut reaches a predetermined position on said screw, cam means on said spindle, a cam follower on said displaceable member which engages said cam means when the retaining means are released to limit the degree of closing of the valve, said cam means controlling the final closing of the valve, means for manually rotating said screw, and a counter coupled to said screw.

References Cited in the file of this patent

UNITED STATES PATENTS

| | | |
|---|---|---|
| 619,473 | Fowler | Feb. 14, 1899 |
| 1,035,189 | Hibberd | Aug. 13, 1912 |